United States Patent
Tamaki et al.

(10) Patent No.: US 11,175,065 B2
(45) Date of Patent: Nov. 16, 2021

(54) AIR CONDITIONING APPARATUS

(71) Applicant: Mitsubishi Electric Corporation, Tokyo (JP)

(72) Inventors: Shogo Tamaki, Tokyo (JP); Kojiro Motomura, Tokyo (JP); Haruo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 152 days.

(21) Appl. No.: 15/777,970

(22) PCT Filed: Jan. 20, 2016

(86) PCT No.: PCT/JP2016/051582
§ 371 (c)(1),
(2) Date: May 22, 2018

(87) PCT Pub. No.: WO2017/126059
PCT Pub. Date: Jul. 27, 2017

(65) Prior Publication Data
US 2018/0347846 A1    Dec. 6, 2018

(51) Int. Cl.
*F24D 11/02*    (2006.01)
*F24F 11/84*    (2018.01)
(Continued)

(52) U.S. Cl.
CPC .............. *F24F 11/84* (2018.01); *F24D 3/08* (2013.01); *F24D 3/18* (2013.01); *F24D 11/0235* (2013.01);
(Continued)

(58) Field of Classification Search
CPC .............. F24F 11/84; F24D 3/08; F24D 3/18
See application file for complete search history.

(56) References Cited

U.S. PATENT DOCUMENTS

2010/0298986 A1* 11/2010 Stachler .............. F24F 11/62
700/276
2011/0289950 A1* 12/2011 Kim .................... F24D 11/0214
62/160
(Continued)

FOREIGN PATENT DOCUMENTS

CN    102261766 A    11/2011
CN    102326036 A    1/2012
(Continued)

OTHER PUBLICATIONS

Office action dated Jul. 2, 2019 issued in corresponding JP patent application No. 2017-562216 (and English translation thereof).
(Continued)

*Primary Examiner* — Elizabeth J Martin
*Assistant Examiner* — Nael N Babaa
(74) *Attorney, Agent, or Firm* — Posz Law Group, PLC

(57) ABSTRACT

When a heating operation mode using a heating unit is specified and when a hot water supply request using the hot water in a hot water storage tank does not occur, an air conditioning apparatus transmits a first selection signal for selecting the heating unit to a three-way valve. When the heating operation mode is specified and when the hot water supply request occurs, the air conditioning apparatus transmits, to the three-way valve, a second selection signal for changing a destination of circulation of secondary refrigerant from the heating unit to a coil heat exchanger, and transmits an operation start signal to a refrigerant indoor unit.

10 Claims, 13 Drawing Sheets

(51) Int. Cl.
*F24D 17/02* (2006.01)
*F24D 19/10* (2006.01)
*F24D 3/18* (2006.01)
*F25B 13/00* (2006.01)
*F24D 3/08* (2006.01)
*F25B 41/20* (2021.01)
*F24D 17/00* (2006.01)
*F24F 3/06* (2006.01)
*F25B 6/02* (2006.01)
*F25B 49/02* (2006.01)

(52) U.S. Cl.
CPC .......... *F24D 17/001* (2013.01); *F24D 17/02* (2013.01); *F24D 19/1072* (2013.01); *F24F 3/06* (2013.01); *F25B 6/02* (2013.01); *F25B 13/00* (2013.01); *F25B 41/20* (2021.01); *F24D 2200/12* (2013.01); *F24D 2200/31* (2013.01); *F25B 49/02* (2013.01); *F25B 2313/003* (2013.01); *F25B 2313/0233* (2013.01); *F25B 2313/0314* (2013.01); *F25B 2700/1931* (2013.01); *F25B 2700/2104* (2013.01); *F25B 2700/2106* (2013.01); *F25B 2700/21152* (2013.01); *F25B 2700/21161* (2013.01)

(56) References Cited

U.S. PATENT DOCUMENTS

2012/0036876 A1   2/2012   Honda
2013/0306301 A1*  11/2013  Tamaki ................ F25B 30/00
                                              165/287

FOREIGN PATENT DOCUMENTS

| | | |
|---|---|---|
| EP | 2 390 588 A2 | 11/2011 |
| EP | 2 402 682 A1 | 1/2012 |
| EP | 2 620 711 A2 | 7/2013 |
| JP | 2004-011965 A | 1/2004 |
| JP | 2008-032376 A | 2/2008 |
| JP | 2010-196947 A | 9/2010 |
| JP | 2013-155911 A | 8/2013 |
| JP | 2014-115003 A | 6/2014 |
| WO | 2012/101804 A1 | 8/2012 |

OTHER PUBLICATIONS

Extended European Search Report dated Dec. 5, 2018 in corresponding European patent application No. 16886301.7.
International Search Report of the International Searching Authority dated Apr. 19, 2016 for the corresponding International application No. PCT/JP2016/051582 (and English translation).
Office Action dated Dec. 26, 2019 issued in corresponding CN patent application No. 201680078422.8 (and English translation).
Office Action dated Jul. 16, 2020 issued in the counterpart European patent application No. 16886301.
Office Action dated Aug. 7, 2020 issued in the counterpart CN patent application No. 201680078422.8 (and English translation).
Office Action dated Nov. 24, 2020 issued in the counterpart CN patent application No. 201680078422.8 (and English translation).

\* cited by examiner

500

AIR CONDITIONING APPARATUS

CROSS REFERENCE TO RELATED APPLICATION

This application is a U.S. national stage application of PCT/JP2016/051582 filed on Jan. 20, 2016, the contents of which are incorporated herein by reference.

TECHNICAL FIELD

The present invention relates to an air conditioning apparatus that can simultaneously perform heating for warming the indoor air and hot water supply. Particularly, the present invention relates to an air conditioning apparatus that continues to perform heating even during hot water supply.

BACKGROUND ART

A heat-pump heat source system that simultaneously performs a heating operation for warming the indoor air and a hot water supply operation for storing heat in a hot water storage tank for a hot water supply application has been known. In such a conventional heat-pump heat source system, heating and hot water supply can be performed with one system. Therefore, a placement space can be reduced as compared with the case of using separate systems. As a result, a system that performs both heating and hot water supply can also be provided to a property having considerable placement restrictions.

Japanese Patent Laying-Open No. 2013-155911 (PTD 1) discloses a system that can selectively perform hot water supply using the hot water and heating with one heat-pump heat source device.

CITATION LIST

Patent Document

PTD 1: Japanese Patent Laying-Open No. 2013-155911

SUMMARY OF INVENTION

Technical Problem

A problem in the case of heating secondary refrigerant (such as water or brine) with primary refrigerant (such as HFC refrigerant) of a heat pump and using the secondary refrigerant for heating of a hot water supply tank and hot water heating is that the temperature of the secondary refrigerant decreases and hot water heating cannot he performed (or the temperature does not increase sufficiently) when a hot water supply request occurs during hot water heating. In order to deal with the above-described problem, a capacity of the heat pump may be increased. However, this leads to an increase in size, and thus, it is impossible to obtain the advantage of reduction in size produced by the use of the secondary refrigerant for both heating of the hot water supply tank and hot water heating.

The present invention has been made to solve the above-described problem, and an object is to provide an air conditioning apparatus that can suppress an increase in capacity of a heat pump and prevent the temperature of a room under hot water heating from decreasing during hot water supply.

Solution to Problem

An air conditioning apparatus according to the present invention is an air conditioning apparatus configured to perform heating and hot water supply, and includes: a heat source unit; a heating unit; a refrigerant indoor unit; a hot water unit; and a controller.

The heat source unit is configured to operate as a heat source of first refrigerant. The heating unit is placed in a room and is configured to perform heating by circulating second refrigerant. The refrigerant indoor unit is configured to receive the first refrigerant from the heat source unit and perform air conditioning of the room where the heating unit is placed. The hot water unit is configured to heat the second refrigerant by circulating the first refrigerant and generate hot water by circulating the second refrigerant.

The hot water unit includes: a hot water storage tank; a first heat exchanging unit; a second heat exchanging unit; and a flow path selection unit. The first heat exchanging unit is configured to exchange heat between the first refrigerant and the second refrigerant. The second heat exchanging unit is configured to exchange heat between the second refrigerant and water in the hot water storage tank. The flow path selection unit is configured to select one of the second heat exchanging unit and the heating unit to form a circulation passage between the selected unit and the first heat exchanging unit.

The flow path selection unit selects the second heat exchanging unit, when the heating unit is operating and when a request for hot water in the hot water storage tank occurs.

Advantageous Effects of Invention

According to the present invention, it is possible to prevent the temperature of the room under hot water heating from decreasing during execution of hot water supply, without excessively increasing the capacity of the heat source unit. As a result, indoor heating can be maintained and a shortage of the hot water in the hot water storage tank can be avoided, and thus, a high degree of comfort can be achieved.

DESCRIPTION OF EMBODIMENTS

Figure 1:
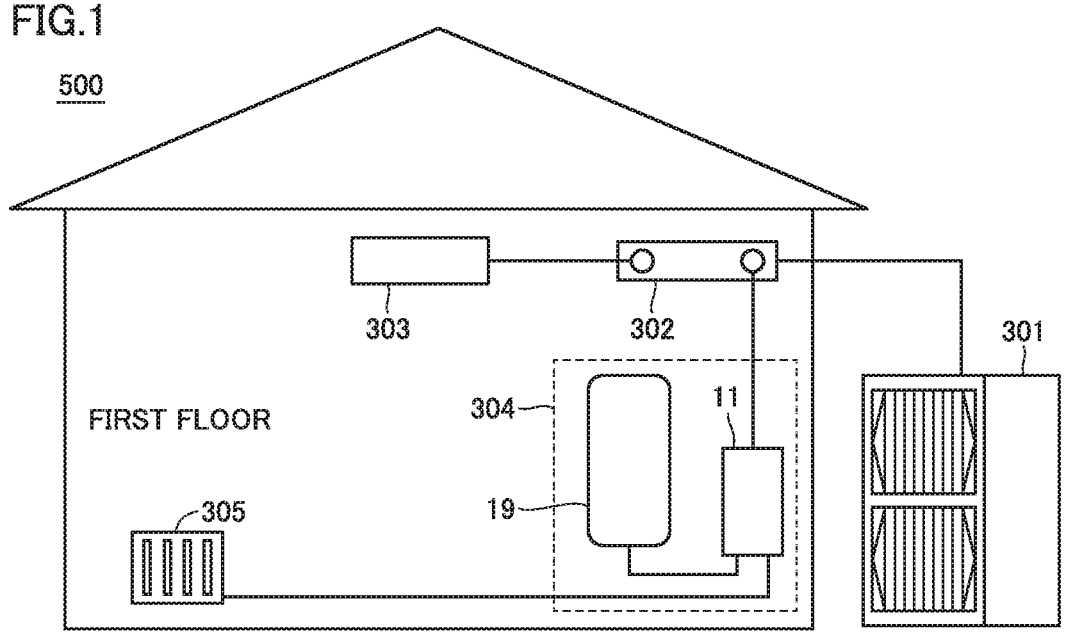
FIG. 1 is a schematic view showing an overall configuration of an air conditioning apparatus according to a first embodiment.

Embodiments of the present invention will be described in detail hereinafter with reference to the drawings. While a plurality of embodiments will be described below, an appropriate combination of features described in each of the embodiments is contemplated as of the filing of the original application. In the drawings, the same or corresponding portions are designated by the same reference characters and description thereof will not be repeated.

First Embodiment

Overall Configuration

FIG. 1 is a schematic view showing an overall configuration of an air conditioning apparatus according to a first embodiment. Referring to FIG. 1, a heat source unit 301 is arranged outdoors, and a branch unit 302, a refrigerant indoor unit 303, a hot water unit 304, and a hot water heating unit 305 are arranged indoors. The units are connected by pipes as shown in FIG. 1. Refrigerant indoor unit 303 is placed in the same room as hot water heating unit 305.

Refrigerant indoor unit 303 supplies the hot air into the room to perform heating. Hot water unit 304 stores the hot water in a tank for the purpose of hot water supply. The arrangement shown in FIG. 1 is one example of unit placement and the unit arrangement to which the present invention is applied is not limited to the arrangement in FIG. 1. For example, a plurality of refrigerant indoor units 303 may be provided.

Device Configuration

Figure 2:
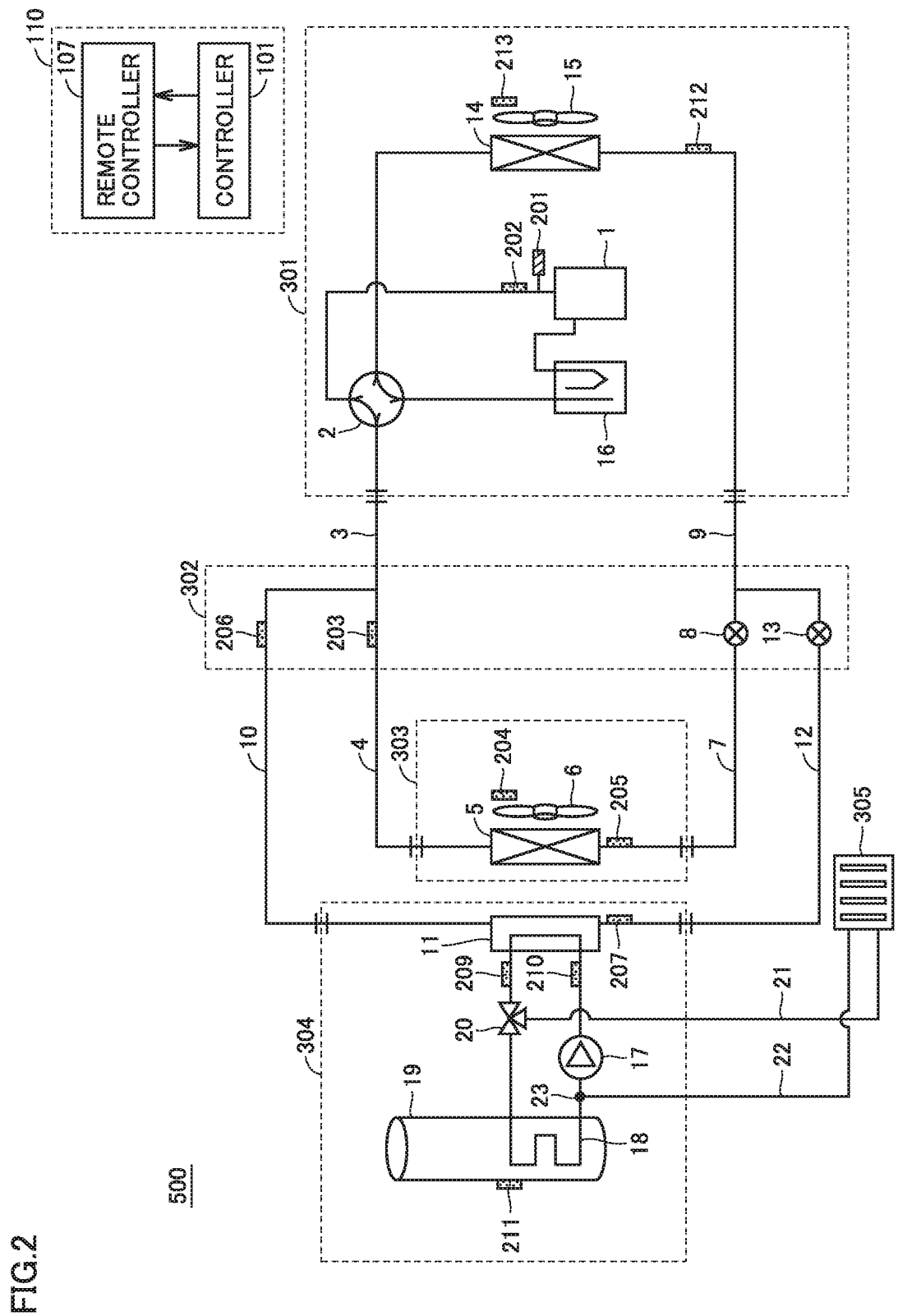
FIG. 2 is a diagram showing a configuration of a refrigerant circuit of the air conditioning apparatus according to the first embodiment.

FIG. 2 is a diagram showing a configuration of a refrigerant circuit of the air conditioning apparatus according to the first embodiment. Referring to FIGS. 1 and 2, an air conditioning apparatus 500 includes heat source unit 301, hot water heating unit 305, refrigerant indoor unit 303, hot water unit 304, and a controller 110. Air conditioning apparatus 500 is configured to perform heating and hot water supply.

Heat source unit 301 is a heat pump-type heat source unit that operates as a heat source of primary refrigerant. Hot water heating unit 305 performs heating using secondary refrigerant. Refrigerant indoor unit 303 performs air conditioning of the room in which hot water heating unit 305 is placed, using the primary refrigerant delivered from heat source unit 301. Hot water unit 304 heats the secondary refrigerant which is a liquid medium, using the primary refrigerant delivered from heat source unit 301, and generates the hot water using the secondary refrigerant.

The primary refrigerant used in air conditioning apparatus 500 is not particularly limited. HFC (Hydro Fluoro Carbon) refrigerant such as R410A and R32, HCFC (Hydro Chloro Fluoro Carbon) refrigerant, and natural refrigerant such as hydrocarbon and helium can, for example, be used. Water, brine mixed with an antifreezing solution, or the like can be used as the liquid medium of the secondary refrigerant.

Hot water unit 304 includes a hot water storage tank 19, a water heat exchanger 11, a coil heat exchanger 18, a flow path selection unit (e.g., a three-way valve 20), and a water pump 17.

Water heat exchanger 11 is a first heat exchanging unit that exchanges heat between the primary refrigerant and the secondary refrigerant. Coil heat exchanger 18 is a second heat exchanging unit that heats the water in hot water storage tank 19 using the secondary refrigerant. The flow path selection unit selects one of coil heat exchanger 18 and hot water heating unit 305 in accordance with a selection signal, to form a circulation passage between the selected unit and water heat exchanger 11. Water pump 17 circulates the secondary refrigerant through the circulation passage. FIG. 2 shows three-way valve 20 as an example of the flow path selection unit. However, the flow path selection unit may have another configuration as long as it performs switching of the flow path. For example, a plurality of electromagnetic valves may be combined for use.

By performing a vapor-compression-type cycle operation, air conditioning apparatus 500 shown in FIG. 2 can simultaneously process a heating command (ON/OFF of heating) by refrigerant indoor unit 303 and a hot water supply request command (ON/OFF of hot water supply) by hot water unit 304. In addition, by switching three-way valve 20 in hot water unit 304, air conditioning apparatus 500 shown in FIG. 2 can selectively perform one of heating of the water in hot water storage tank 19 and heating by hot water heating unit 305.

Heat source unit 301 and branch unit 302 are connected by a pipe 3 and a pipe 9 which are refrigerant pipes. In addition, branch unit 302 and refrigerant indoor unit 303 are connected by a pipe 4 and a pipe 7 which are refrigerant pipes. Furthermore, branch unit 302 and hot water unit 304 are connected by a pipe 10 and a pipe 12 which are refrigerant pipes.

Heat source unit 301 includes a compressor 1, a four-way valve 2, a heat-source-side heat exchanger 14, a heat-source-side blower 15, an accumulator 16, a pressure sensor 201, and temperature sensors 202, 212 and 213. Pressure sensor 201 is provided on the discharge side of compressor 1 and measures the refrigerant pressure in the place where pressure sensor 201 is placed. Temperature sensor 202 is provided on the discharge side of compressor 1, and temperature sensor 212 is provided on the liquid side of heat exchanger 14. Temperature sensors 202 and 212 measure the temperature of the primary refrigerant in the places where temperature sensors 202 and 212 are placed, respectively. Temperature sensor 213 is provided at an air suction port and measures the outdoor air temperature.

Branch unit 302 includes a refrigerant-using-side decompressing mechanism 8, and a hot-water-side decompressing mechanism 13. An electronic expansion valve can, for example, be used as the decompressing mechanism. A temperature sensor 203 is provided on the side connected to pipe 4 of refrigerant indoor unit 303, and a temperature sensor 206 is provided on pipe 10 connected to hot water unit 304. Temperature sensors 203 and 206 measure the temperature of the primary refrigerant In the places where temperature sensors 203 and 206 are placed, respectively.

Refrigerant indoor unit 303 includes a refrigerant-using-side heat exchanger 5 and a refrigerant-using-side blower 6.

Blower 6 is adjustable in an amount of delivered air. Refrigerant indoor unit 303 uses heat exchanger 5 to perform heat exchange between the indoor air sucked by the function of blower 6 and the primary refrigerant, and then, blows the air into the room.

Refrigerant indoor unit 303 includes a temperature sensor 205 provided on the side connected to pipe 7 of heat exchanger 5 and measuring the temperature of the primary refrigerant in the place where temperature sensor 205 is placed. A temperature sensor 204 is also provided on the indoor air suction port side and measures the temperature of the indoor air flowing into refrigerant indoor unit 303.

Hot water unit 304 includes water heat exchanger 11 and a water-side circuit. The water-side circuit herein is a circuit formed by water pump 17, coil heat exchanger 18 and hot water storage tank 19, and circulating the secondary refrigerant which is a liquid medium as a medium of heat exchange. Water pump 17 is configured such that the rotation speed thereof can be changed by an inverter, and circulates the liquid medium. Hot water storage tank 19 is of filled-up type.

Although not shown in detail in FIG. 2, hot water storage tank 19 is configured to store the boiled hot water, and to allow the hot water to exit from an upper part of the tank in response to a hot water exit request and allow an amount of low-temperature tap water corresponding to the amount of exiting water to be supplied from a lower part of the tank.

Hot water unit 304 includes a temperature sensor 207 provided on the side connected to pipe 12 of water heat exchanger 11. Temperature sensor 207 measures the temperature of the primary refrigerant in the place where temperature sensor 207 is placed. In addition, a temperature sensor 209 is placed on the downstream side of water heat exchanger 11 in a flow path of the secondary refrigerant, a temperature sensor 210 is placed on the upstream side of water heat exchanger 11 in the flow path of the secondary refrigerant, and a temperature sensor 211 is placed on a side surface of hot water storage tank 19. Temperature sensors 209, 210 and 211 measure the temperature of the secondary refrigerant (water temperature when the secondary refrigerant is water) in the locations where temperature sensors 209, 210 and 211 are placed, respectively.

Hot water heating unit 305 is for performing heat exchange with the indoor air in the location where hot water heating unit 305 is placed, and is configured to include a radiator, a fan coil, a hot water floor heating or the like.

Figure 3:
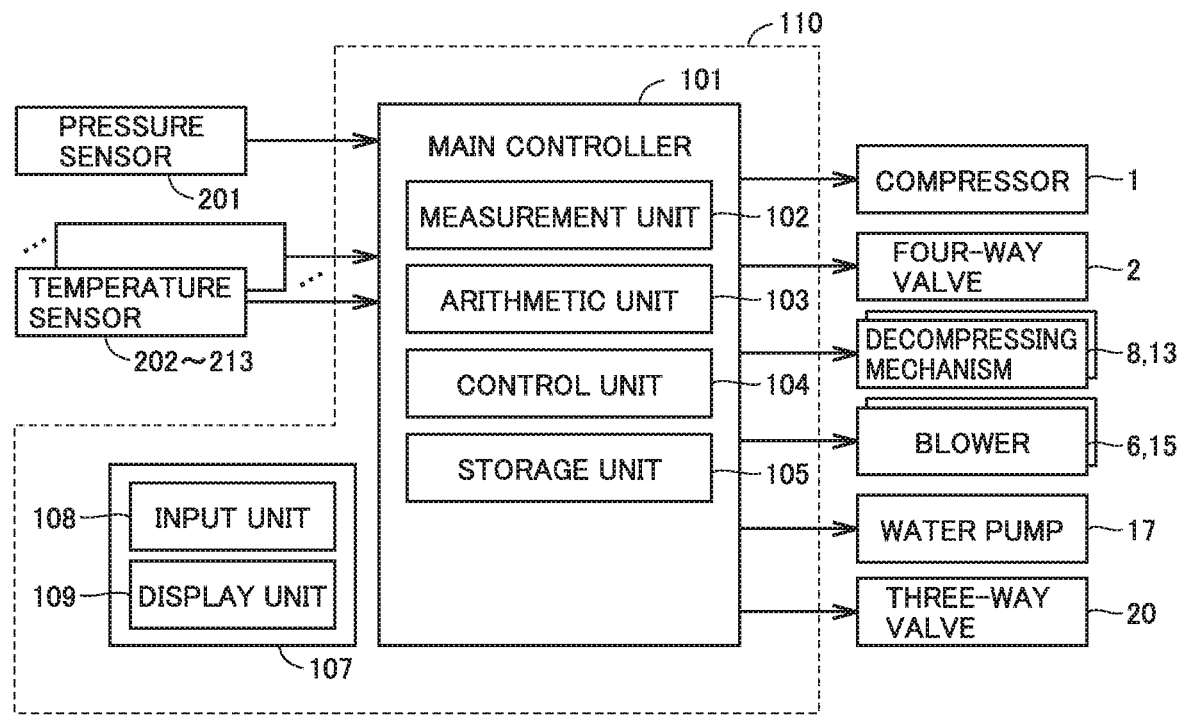
FIG. 3 is a block diagram showing a configuration of connection between a controller 110 and sensor and actuator groups.

Next, specific contents of control by controller 110 will be described in detail. FIG. 3 is a block diagram showing a configuration of connection between controller 110 and sensor and actuator groups.

Referring to FIG. 3, controller 110 is configured to include a main controller 101 that executes control of air conditioning apparatus 500, and a remote controller 107. Although not shown in FIG. 3, main controller 101 also includes a component such as a receiving circuit that can also read a command from remote controller 107.

The sensor group is a general term including various types of temperature sensors 202 to 213 and pressure sensor 201. The actuator group is a general term including compressor 1, four-way valve 2, decompressing mechanisms 8 and 13, blowers 6 and 15, water pump 17, and three-way valve 20.

Main controller 101 is configured to include a measurement unit 102, an arithmetic unit 103, a control unit 104, and a storage unit 105.

Measurement unit 102 reads various amounts detected by pressure sensor 201 and various types of temperature sensors 202 to 213. Based on the information read by measurement unit 102, arithmetic unit 103 executes control computation. Based on the result of computation by arithmetic unit 103, control unit 104 performs the control operation to thereby execute control of the actuator group.

In addition, main controller 101 has embedded therein storage unit 105 that stores a predetermined constant, a set value transmitted from remote controller 107, or the like. Control unit 104 can refer to and rewrite these stored contents as necessary.

Although not shown in FIG. 2, each of branch unit 302, refrigerant indoor unit 303 and hot water unit 304 is connected to heat source unit 301 by a communication line (wired or wireless). With such a configuration, control unit 104 in main controller 101 can directly transmit a command signal to each of branch unit 302, refrigerant indoor unit 303 and hot water unit 304.

Measurement unit 102, arithmetic unit 103 and control unit 104 described above are formed by microcomputers, and storage unit 105 is formed by a semiconductor memory and the like. The information about whether or not refrigerant indoor unit 303 is placed in the same room as hot water heating unit 305 is input from an input unit 108 at the time of placement work, and is stored in storage unit 105. The placement location may be any information as long as it is the information that can tell whether hot water heating unit 305 and refrigerant indoor unit 303 are placed in the same room or in different rooms. For example, at the time of placement of refrigerant indoor unit 303, an input about whether hot water heating unit 305 "is placed" or "is not placed" in the same room may be provided.

In this case, controller 110 includes input unit 108 that receives the information of placement locations of refrigerant indoor unit 303 and hot water heating unit 305, storage unit 105 that stores the information of placement locations, and control unit 104 that determines whether or not refrigerant indoor unit 303 is placed in the room where hot water heating unit 305 is placed, based on the information of placement locations stored in storage unit 105.

Although the case of arranging main controller 101 in the same housing as that of heat source unit 301 is assumed in FIG. 2, the arrangement place of main controller 101 is not limited thereto.

Through input unit 108 of remote controller 107, the user can select ON /OFF of cooling, ON/OFF of heating, ON/OFF of hot water supply, and ON/OFF of hot water heating, and can input an indoor set temperature, a boiling temperature and a hot water set temperature. Control unit 104 in main controller 101 can read the set data based on the user's operation.

Remote controller 107 is provided with a display unit 109 that displays a current operation mode, a set temperature, and the urging to change the set temperature.

When the detected temperature by temperature sensor 211 on the wall side surface of hot water storage tank 19, which is read by measurement unit 102, becomes equal to or lower than a predetermined value (e.g., equal to or lower than 45° C.), arithmetic unit 103 can determine that hot water supply is automatically turned on.

Next, operation states of the devices in various operation modes performed in air conditioning apparatus 500 will be described.

Hot Water Heating Operation Mode

Normally, in the system according to the first embodiment, heating by refrigerant indoor unit 303 is performed during the intermediate period, and 24-hour whole-building air conditioning (heating) by hot water heating unit 305 is performed during the winter period because it is cold every day. The operation mode of performing heating by hot water heating unit 305 will be referred to as "hot water heating operation mode".

Air conditioning apparatus 500 performs the hot water heating operation mode in accordance with a "hot water heating ON" command that can be input from input unit 108 of remote controller 107. A state of flow of the refrigerants and a method for controlling the devices in the hot water heating operation mode will be described below.

Referring to FIG. 2, in the hot water heating operation mode, four-way valve 2 is controlled such that the discharge side of compressor 1 is connected to pipe 3 and the suction side of compressor 1 is connected to the gas side of heat exchanger 14. In addition, three-way valve 20 is controlled such that water heat exchanger 11 and hot water heating unit 305 communicate with each other and the coil heat exchanger 18 side is closed. In addition, hot water heating unit 305 is high in heat capacity and thus is used in the case of 24-hour operation during a period of severe cold. Under such a circumstance, refrigerant indoor unit 303 is unnecessary, and thus, decompressing mechanism 8 is controlled to be dosed. The high-temperature and high-pressure gas refrigerant (primary refrigerant) discharged from compressor 1 flows via four-way valve 2 through pipe 3 and pipe 10.

After flowing through pipe 10, the primary refrigerant flows into water heat exchanger 11 and heats the secondary refrigerant (intermediate water) supplied to the secondary side by water pump 17. Thereafter, the primary refrigerant flows out of water heat exchanger 11, flows through pipe 12, is decompressed by decompressing mechanism 13, and flows through pipe 9 into heat exchanger 14. In heat exchanger 14, the primary refrigerant is subjected to heat exchange with the outdoor air supplied by blower 15, to thereby become the low-pressure gas refrigerant. Thereafter, the low-pressure gas refrigerant (primary refrigerant) that has flown out of heat exchanger 14 flows via four-way valve 2 through accumulator 16, and then, is again sucked into compressor 1.

An operation state of the water-side circuit in the hot water heating operation mode will be described. The secondary refrigerant delivered by water pump 17 is heated by the primary refrigerant in water heat exchanger 11, to thereby increase in temperature. Then, the secondary refrigerant having the increased temperature flows through three-way valve 20 and a pipe 21, and is subjected to heat exchange with the indoor air in the placement location in hot water heating unit 305, to thereby decrease in temperature. Thereafter, the secondary refrigerant flows through a pipe 22 and a branch point 23, and again flows into water pump 17. The location where three-way valve 20 is provided may be branch point 23.

An operation frequency of compressor 1 is controlled such that a condensing temperature has a condensing temperature target value (e.g., 50° C.). The condensing temperature is a saturation temperature at the pressure detected by pressure sensor 201. A rotation speed of blower 15 is fixed to a maximum rotation speed. Decompressing mechanism 13 is controlled such that the degree of supercooling in water heat exchanger 11 has a predetermined value. The degree of supercooling in water heat exchanger 11 is obtained by subtracting the temperature detected by temperature sensor 207 from the saturation temperature at the pressure detected by pressure sensor 201. A rotation speed of water pump 17 is fixed to a predetermined rotation speed. The above-described control is executed by main controller 101.

Hot Water Supply Operation Mode

Next, an operation state in a hot water supply operation mode will be described. Air conditioning apparatus 500 can perform the hot water supply operation mode in accordance with a "hot water supply ON" command that can be input from input unit 108 of remote controller 107. A state of flow of the primary refrigerant and the secondary refrigerant and a method for controlling the devices in the hot water supply operation mode will be described below.

Three-way valve 20 connects water heat exchanger 11 and coil heat exchanger 18, and closes the pipe 21 side. The operation frequency of compressor 1 is controlled to be fixed to a maximum frequency in order to avoid a shortage of the hot water.

Next, an operation state of the water-side circuit in the hot water supply operation mode will be described. The secondary refrigerant delivered by water pump 17 is heated by the primary refrigerant in water heat exchanger 11, to thereby increase in temperature. Then, the secondary refrigerant having the increased temperature flows through three-way valve 20 into hot water storage tank 19, and heats the water in hot water storage tank 19 in coil heat exchanger 18, to thereby decrease in temperature. Thereafter, the secondary refrigerant is again delivered through hot water storage tank 19 to water heat exchanger 11, to thereby increase in temperature again in water heat exchanger 11. With such a process, the hot water in hot water storage tank 19 is boiled.

The remaining operation is similar to the operation in the hot water heating operation mode.

Assisted Heating Operation When Hot Water Supply Request Occurs During Hot Water Heating Operation Mode Since it is cold every day during the winter period, 24-hour whole-building air conditioning (heating) is performed by hot water heating unit 305. Hot water unit 304 shown in FIG. 2 can only select one of hot water supply and hot water heating. Conventionally, when a hot water supply request occurs during the hot water heating operation, the hot water heating operation is stopped and the hot water supply operation is performed. As a result, indoor heating must be temporarily suspended, which impairs the comfort of heating.

Accordingly, in the present embodiment, when the hot water supply request occurs, controller 110 stops hot water heating by hot water heating unit 305 and heats the water in hot water storage tank 19 to generate the hot water in response to the hot water supply request, and in the meantime, controller 110 performs assisted heating by refrigerant indoor unit 303.

Controller 110 is configured to switch three-way valve 20 so as to select coil heat exchanger 18, and start heating by refrigerant indoor unit 303, when hot water heating unit 305 is being used and when the hot water supply request using the hot water in hot water storage tank 19 occurs.

That is, when the heating operation mode using hot water heating unit 305 is specified and when the hot water supply request using the hot water in hot water storage tank 19 does not occur, controller 110 transmits a first selection signal for selecting hot water heating unit 305 to three-way valve 20. When the heating operation mode is specified and when the hot water supply request occurs, controller 110 transmits, to three-way valve 20, a second selection signal for changing a destination of circulation of the secondary refrigerant from hot water heating unit 305 to coil heat exchanger 18, and transmits an operation start signal to refrigerant indoor unit 303.

When the heating operation mode is specified and when a change from a state with the hot water supply request to a state without the hot water supply request occurs, controller 110 returns the selection signal to be transmitted to three-way valve 20 from the second selection signal to the first selection signal, and transmits an operation stop signal to refrigerant indoor unit 303.

This control will be described with reference to a flowchart.

Figure 4:
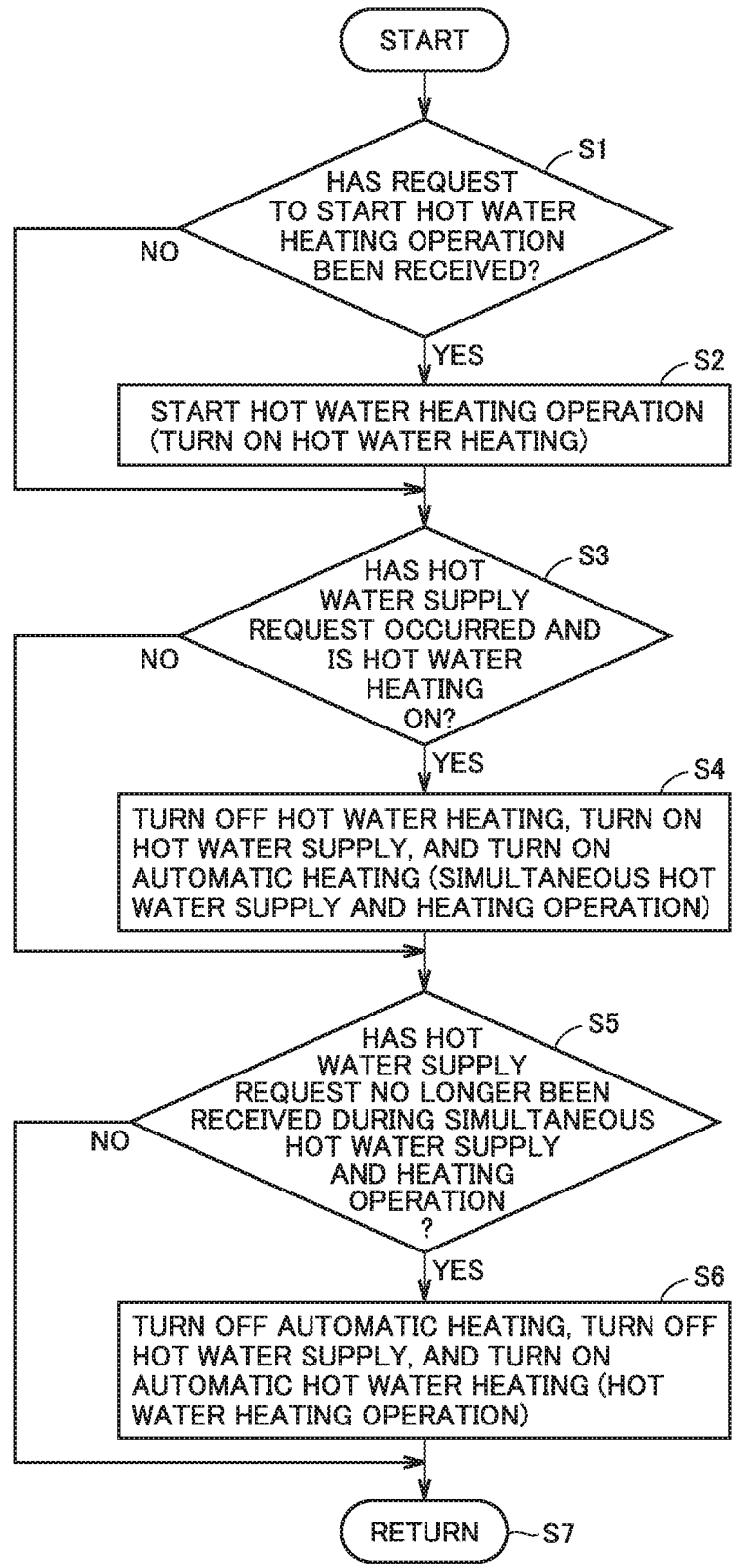
FIG. 4 is a flowchart for illustrating control when a hot water supply request occurs during a hot water heating operation.

FIG. 4 is a flowchart for illustrating control when the hot water supply request occurs during the hot water heating operation The process in this flowchart is called from a main routine and executed at axed time intervals. Referring to FIGS. 2 and 4, in step S1, controller 110 determines whether or not a request to start the hot water heating operation has been received from input unit 108 of remote controller 107. When the request to start the hot water heating operation has been received (YES in S1), controller 110 controls heat source unit 301, branch unit 302 and hot water unit 304 so as to start the hot water heating operation in step S2, and moves the process to step S3. On the other hand, when the request to start the hot water heating operation has not been received (NO in S1), controller 110 moves the process to step S3 without performing the process in step 52.

In step S3, it is determined whether or not the hot water supply request has occurred and hot water heating is ON. When the condition of step S3 is satisfied, the process is moved to step S4. In step S4, controller 110 turns on heating by refrigerant indoor unit 303 placed in the same room as hot water heating unit 305, and controls three-way valve 20 such that hot water heating unit 305 is turned off and coil heat exchanger 18 is turned on, to thereby perform the simultaneous heating and hot water supply operation. When the condition of step S3 is not satisfied, the process is moved to step S5 without performing step S4.

In step S5, controller 110 determines whether or not the hot water supply request has no longer been received during the simultaneous hot water supply and heating operation. The case in which the hot water supply request has no longer been received refers to the case in which hot water supply has been completed and heating has progressed in coil heat exchanger 18, and as a result, the hot water has accumulated in hot water storage tank 19. Based on an increase in temperature detected by temperature sensor 211, controller 110 can detect that the hot water supply request has no longer been received. When the hot water supply request has no longer been received in step S5, the process is moved to step S6. In step S6, automatic heating by refrigerant indoor unit 303 is turned off, and three-way valve 20 is controlled such that hot water supply is turned off and automatic hot water heating is turned on. On the other hand, when the hot water supply request continues in step S5 or when the simultaneous hot water supply and heating operation is not being performed in step S5 (NO in S5), and when the process in step S6 is performed, the process is returned to the main routine in step S7.

With the above-described control, indoor heating is not suspended during hot water supply, and thus, the indoor temperature is maintained and the comfort is improved.

Here, when refrigerant indoor unit 303 is automatically ON, display unit 109 provides a display indicating that refrigerant indoor unit 303 is automatically ON in step S4. This makes it possible to recognize whether "automatically ON" is a user's choice or "heating ON" results from forgetting to turn off heating. As a display method, display unit 109 may have a display on which characters or pictures may be displayed, or display unit 109 may have a light emitting portion so as to allow remote controller 107 to emit red light, green light or the like.

Second Embodiment

In the first embodiment, description has been given of the simple configuration in which one refrigerant indoor unit 303 and one hot water heating unit 305 are placed in the same room. In a second embodiment, description will be given of an example in which there are a plurality of rooms and the refrigerant indoor units and the hot water heating units are not necessarily placed in the same room.

Overall Configuration

Figure 5:
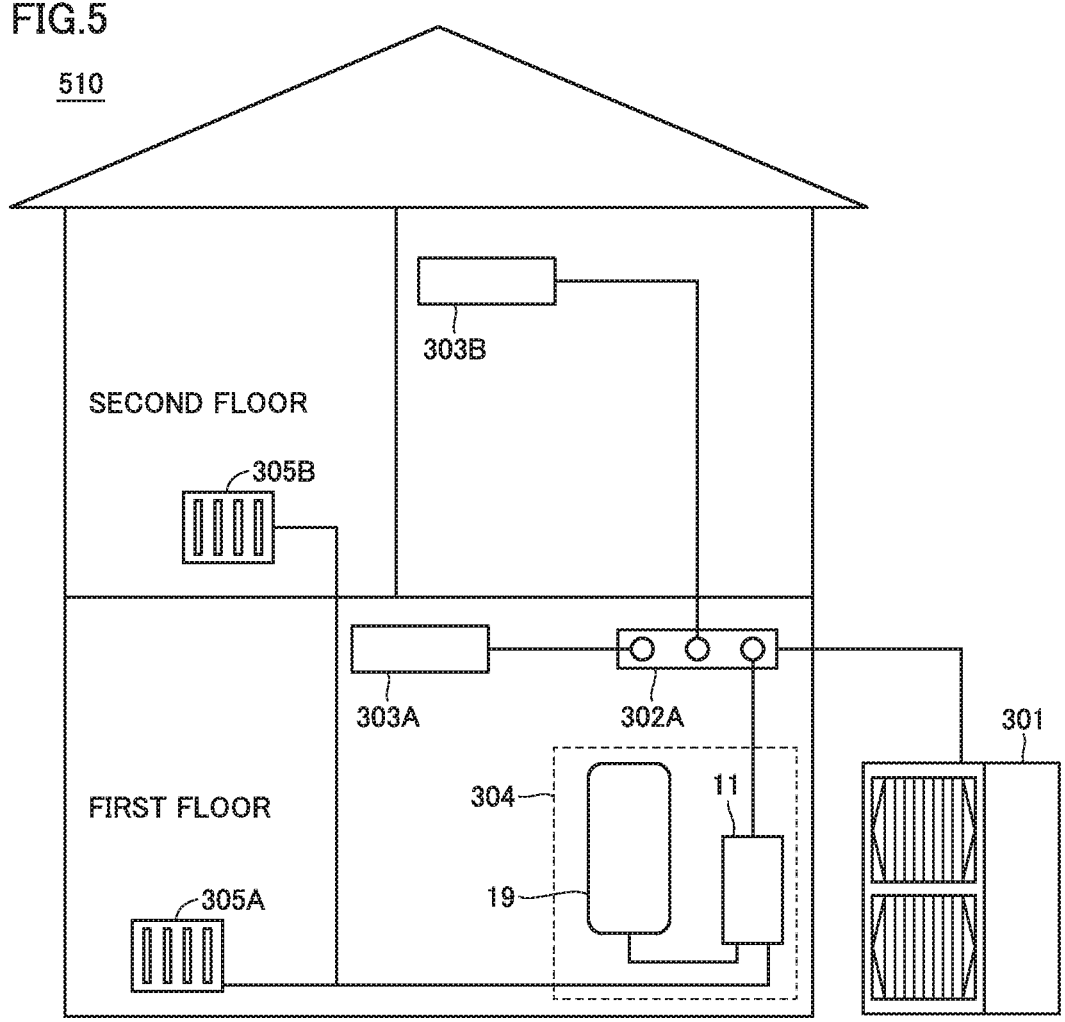
FIG. 5 is a schematic view showing an overall configuration of an air conditioning apparatus according to a second embodiment.

FIG. 5 is a schematic view showing an overall configuration of an air conditioning apparatus according to the second embodiment. Referring to FIG. 5, heat source unit 301 is arranged outdoors, and a branch unit 302A, a refrigerant indoor unit 303A, hot water unit 304, and a hot water heating unit 305A are arranged indoors and on the first floor. On the second floor, a hot water heating unit 305B and a refrigerant indoor unit 303B are placed in separate rooms. The units are connected by pipes as shown in FIG. 5.

Refrigerant indoor unit 303A is placed in the same room as hot water heating unit 305A, and refrigerant indoor unit 303B is not placed in the same room as hot water heating units 305A and 305B.

Each of refrigerant indoor units 303A and 303B supplies the hot air into the room to perform heating. Hot water unit 304 stores the hot water in a tank for the purpose of hot water supply. The arrangement shown in FIG. 5 is one example of unit placement and the unit arrangement to which the present invention is applied is not limited to the arrangement in FIG. 5. For example, three or more refrigerant indoor units 303A and 303B may be provided.

Device Configuration

Figure 6:
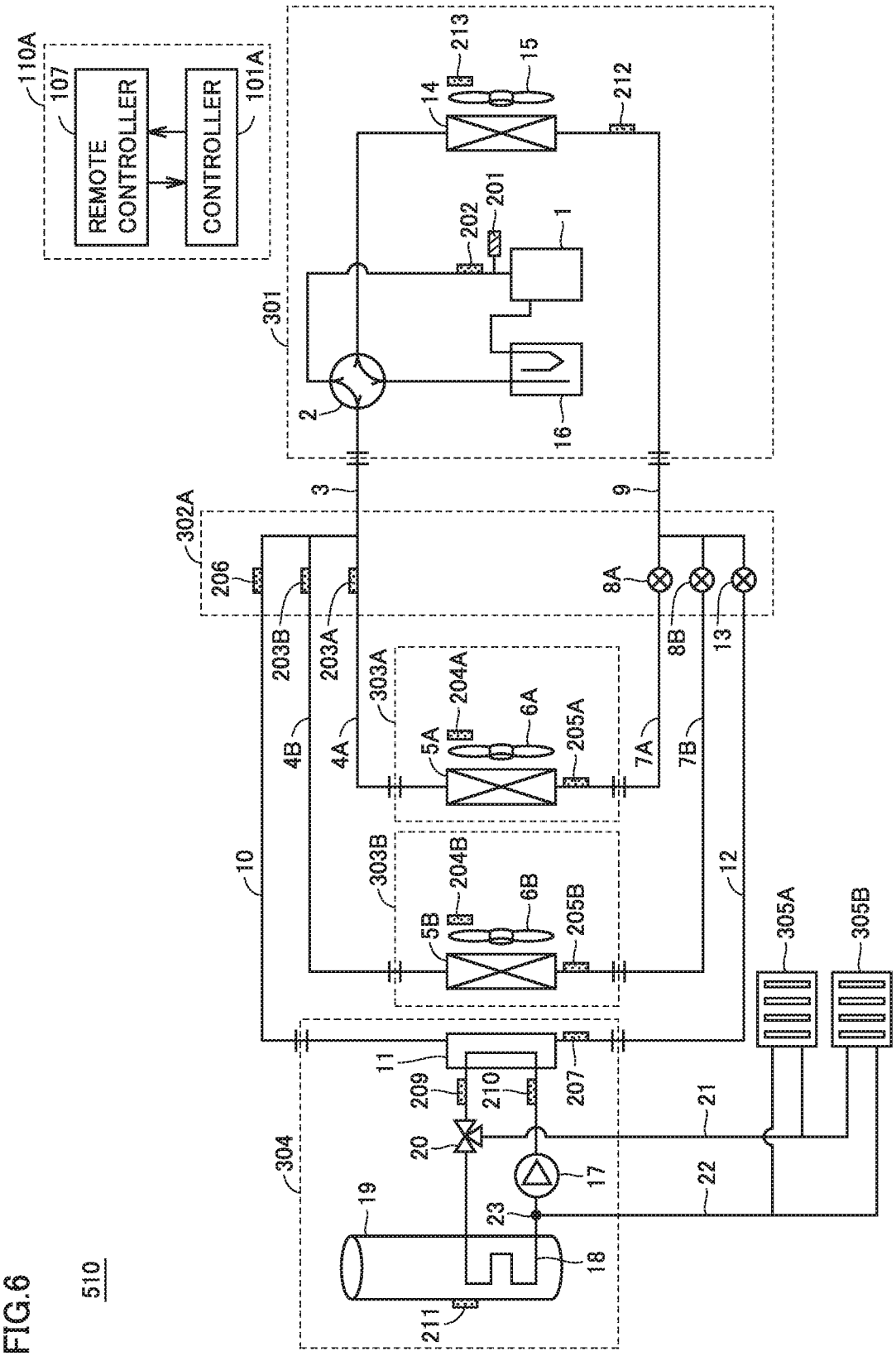
FIG. 6 is a diagram showing a configuration of a refrigerant circuit of the air conditioning apparatus according to the second embodiment.

FIG. 6 is a diagram showing a configuration of a refrigerant circuit of the air conditioning apparatus according to the second embodiment. Referring to FIGS. 5 and 6, an air conditioning apparatus 510 includes heat source unit 301, hot water heating units 305A and 305B, refrigerant indoor units 303A and 303B, hot water unit 304, and a controller 110A.

Air conditioning apparatus 510 shown in FIG. 6 includes two hot water heating units 305A and 305B connected in parallel between three-way valve 20 and branch point 23, instead of hot water heating unit 305 in the configuration of air conditioning apparatus 500 shown in FIG. 2. In addition, air conditioning apparatus 510 includes refrigerant indoor units 303A and 303B connected in parallel between pipe 3 and pipe 9 together with the hot water unit, instead of refrigerant indoor unit 303 in the configuration of air conditioning apparatus 500. Furthermore, air conditioning apparatus 510 includes branch unit 302A instead of branch unit 302.

By performing a vapor-compression-type cycle operation, air conditioning apparatus 510 can simultaneously process a heating command (ON/OFF of heating) by refrigerant indoor units 303A and 303B and a hot water supply request command (ON/OFF of hot water supply) by hot water unit 304. In addition, by switching three-way valve 20 in hot water unit 304, air conditioning apparatus 510 can selectively perform heating of the water in hot water storage tank 19 or heating by hot water heating units 305A and 305B.

Heat source unit 301 and branch unit 302A are connected by pipe 3 and pipe 9 which are refrigerant pipes. In addition, branch unit 302A and refrigerant indoor units 303A and 303B are connected by pipes 4A and 4B and pipes 7A and 7B which are refrigerant pipes. Furthermore, branch unit 302A and hot water unit 304 are connected by pipe 10 and pipe 12 which are refrigerant pipes.

Branch unit 302A includes decompressing mechanisms 8A and 8B, and decompressing mechanism 13. Temperature sensors 203A and 203B are provided on the pipe 4A, 4B sides of refrigerant indoor units 303A and 303B, respectively. Temperature sensor 206 is provided on the pipe 10 side of hot water unit 304. Temperature sensors 203A, 203B and 206 measure the temperature of the refrigerant in the places where temperature sensors 203A, 203B and 206 are placed, respectively.

Refrigerant indoor unit 303A includes a heat exchanger 5A and a blower 6A. Similarly, refrigerant indoor unit 303B includes a heat exchanger 5B and a blower 6B. Blowers 6A and 6B are both adjustable in an amount of delivered air. Refrigerant indoor units 303A and 303B use heat exchangers 5A and 5B to perform heat exchange between the indoor air sucked by the function of blowers 6A and 6B and the refrigerant, and then, blow the air into the room.

Refrigerant indoor units 303A and 303B include temperature sensors 205A and 205B provided on the pipe 7A, 7B sides of heat exchangers 5A and 5B, respectively, and measuring the temperature of the refrigerant in the places where temperature sensors 205A and 205B are placed, respectively. Temperature sensors 204A and 204B are also provided on the indoor air suction port side and measure the temperature of the indoor air flowing into the units.

Since the configurations of heat source unit 301 and hot water unit 304 are described with reference to FIG. 2, description will not be repeated.

Figure 7:
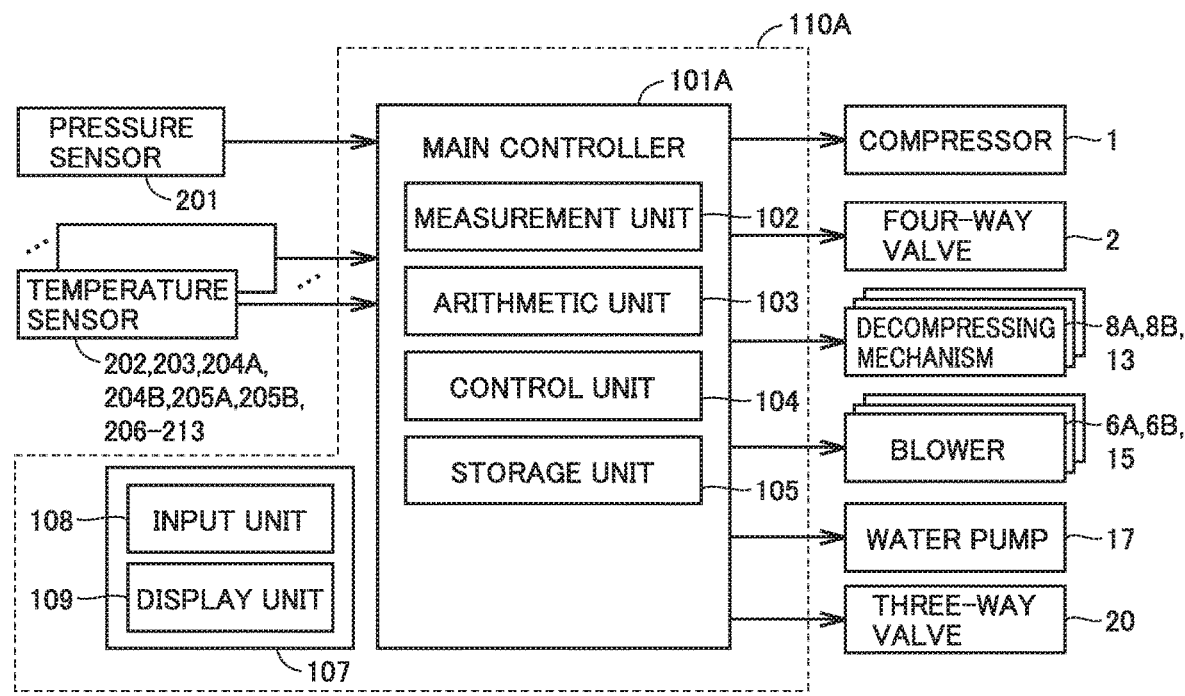
FIG. 7 is a block diagram showing a configuration of connection between a controller 110A and sensor and actuator groups.

FIG. 7 is a block diagram showing a configuration of connection between controller 110A and sensor and actuator groups. Referring to FIG. 7, controller 110A is configured to include a main controller 101A that executes control of air conditioning apparatus 510, and remote controller 107. Although not shown in FIG. 7, main controller 101A also includes a component such as a receiving circuit that can also read a command from remote controller 107.

The sensor group is a general term including various types of temperature sensors 202, 203, 204A, 204B, 205A, 205B, and 206 to 213 and pressure sensor 201. The actuator group is a general term including compressor 1, four-way valve 2, decompressing mechanisms 8A, 8B and 13, blowers 6A, 6B and 15, water pump 17, and three-way valve 20.

Here, in FIG. 7, main controller 101A receives signals from temperature sensors 204A and 204B instead of temperature sensor 204, and controls decompressing mechanisms 8A and 8B instead of decompressing mechanism 8 and controls blowers 6A and 6B instead of blower 6. Except for the above-described point, the configuration of main controller 101A is basically the same as that of main controller 101 shown in FIG. 3.

Measurement unit 102, arithmetic unit 103 and control unit 104 are formed by microcomputers, and storage unit 105 is formed by a semiconductor memory and the like. A work operator inputs the information about whether or not refrigerant indoor units 303A and 303B are placed in the same room as hot water heating units 305A and 305B from input unit 108 at the time of placement work, and causes storage unit 105 to store the information. The stored information may be any information as long as it is the information that can tell whether hot water heating units 305A and 305B and refrigerant indoor units 303A and 303B are placed in the same room or in different rooms, respectively. For example, an input of selecting whether hot water heating units 305A and 305B "are placed" or "are not placed" in the same room as refrigerant indoor units 303A and 303B may be provided.

Hot Water Heating Operation Mode

Next, an operation state in the hot water heating operation mode will be described. Basically, the hot water heating operation mode in the second embodiment is the same as that in the first embodiment.

A difference in the flow path of the secondary refrigerant is that three-way valve 20 is connected such that water heat exchanger 11 and hot water heating units 305A and 305B communicate with each other and the coil heat exchanger 18 side is closed. A difference in the flow path of the primary refrigerant is that decompressing mechanisms 8A and 8B are controlled to be closed. Therefore, the same portion of the detailed description as that of the first embodiment will not be repeated.

Hot Water Supply Operation Mode

Next, an operation state in the hot water supply operation mode will be described. Similarly to the first embodiment, air conditioning apparatus 510 in the second embodiment controls three-way valve 20 so as to connect water heat exchanger 11 and coil heat exchanger 18, and close the pipe 21 side. The operation frequency of compressor 1 is controlled to he fixed to a maximum frequency in order to avoid a shortage of the hot water.

Simultaneous Heating Operation Mode

In the second embodiment, within the heat pump ability of heat source unit 301, a simultaneous heating operation can he performed, in which hot water heating and heating by the refrigerant indoor unit are simultaneously performed. An operation state in this simultaneous heating operation mode will be described in detail.

Air conditioning apparatus 510 can simultaneously process a "heating ON" command and a "hot water heating ON" command that can be input from input unit 108 of remote controller 107. Air conditioning apparatus 510 can perform the simultaneous heating operation for simultaneously performing indoor unit heating by the primary refrigerant and hot water heating by the secondary refrigerant. A state of flow of the primary refrigerant and a method for controlling the devices in the simultaneous heating operation mode will be described below.

In the simultaneous heating operation mode, four-way valve 2 is controlled such that the discharge side of compressor 1 is connected to pipe 3 and the suction side of compressor 1 is connected to the gas side of heat exchanger 14. Three-way valve 20 is controlled such that water heat exchanger 11 and hot water heating units 305A and 305B communicate with each other, and the coil heat exchanger 18 side is controlled to be closed.

The high-temperature and high-pressure gaseous primary refrigerant discharged from compressor 1 flows via four-way valve 2 through pipe 3 and is divided into pipes 4A and 4B and pipe 10.

The primary refrigerant flowing through pipes 4A and 4B flows into heat exchangers 5A and 5B, heats the indoor air supplied by blowers 6A and 6B, and flows out of heat exchangers 5A and 5B. Thereafter, the refrigerant that has flown out of heat exchangers 5A and 5B flows through pipes 7A and 7B and is decompressed by decompressing mechanisms 8A and 8B.

On the other hand, the primary refrigerant divided into pipe 10 flows into water heat exchanger 11 and heats the secondary refrigerant (intermediate water) supplied by water pump 17. Thereafter, the primary refrigerant flows out of water heat exchanger 11, flows through pipe 12, and is decompressed by decompressing mechanism 13. The primary refrigerant that has flown through decompressing mechanism 13 is merged with the primary refrigerant that has flown through heat exchangers 5A and 5B and been decompressed by decompressing mechanisms 8A and 8B.

The merged refrigerant flows through pipe 9 into heat exchanger 14 and is subjected to heat exchange with the outdoor air supplied by blower 15, to thereby become the low-pressure gas refrigerant. Thereafter, the low-pressure gas refrigerant that has flown out of heat exchanger 14 flows via four-way valve 2 through accumulator 16, and then, is again sucked into compressor 1.

An operation frequency of compressor 1 is controlled such that a predetermined condensing temperature has a condensing temperature target value (e.g., 50° C.). A rotation speed of blower 15 is fixed to a maximum rotation speed. Rotation speeds of blowers 6A and 6B are fixed to a command value set on remote controller 107 by the user, and a rotation speed of water pump 17 is fixed to a predetermined rotation speed.

The degree of opening of each of decompressing mechanisms 8A and 8B and decompressing mechanism 13 is controlled by main controller 101 based on a capacity ratio among a capacity of refrigerant indoor unit 303A, a capacity of refrigerant indoor unit 303B and a capacity of hot water unit 304.

An electronic expansion valve can be used as the decompressing mechanism. The degree of opening of the electronic expansion valve can be controlled in accordance with the number of pulses of a control signal. As the number of pulses becomes larger, the degree of opening of the electronic expansion valve becomes higher. For example, when refrigerant indoor unit 303A has 0.5 horsepower, refrigerant indoor unit 303B has 0.8 horsepower, and hot water unit 304 has 2 horsepower, the degree of opening of decompressing mechanism 8A is controlled at 100 pulses, the degree of opening of decompressing mechanism 8B is controlled at 160 pulses, and the degree of opening of decompressing mechanism 13 is controlled at 400 pulses. The capacities of the units are prestored in storage unit 105.

Simultaneous Heating And Hot Water Supply Operation Mode

Air conditioning apparatus 510 can also simultaneously process the "heating ON" command and the "hot water supply ON" command that can be input from input unit 108 of remote controller 107. At this time, air conditioning apparatus 510 performs the simultaneous heating and hot water supply operation. A state of flow of the refrigerants and a method for controlling the devices in the simultaneous heating and hot water supply operation mode will be described below.

Three-way valve 20 is controlled such that water heat exchanger 11 and coil heat exchanger 18 communicates with each other, and the hot water heating unit 305A, 305B side is controlled to be closed. The operation frequency of compressor 1 is controlled to be fixed to a maximum frequency in order to avoid a shortage of the hot water. With such control, hot water unit 304 is operated for hot water supply. The remaining operation is similar to that in the simultaneous heating operation mode.

Assisted Heating Operation When Hot Water Supply Request Occurs During Hot Water Heating Operation Mode As to the assisted heating operation, air conditioning apparatus 510 in the second embodiment is basically configured such that when receiving the hot water supply request, controller 110A stops hot water heating and heats the water in hot water storage tank 19 to generate the hot water, and in the meantime, controller 110A performs assisted heating by refrigerant indoor unit 303A.

Here, as shown in FIG. 6, the three units, i.e., refrigerant indoor unit 303A, refrigerant indoor unit 303B and hot water unit 304, are connected to heat source unit 301 in the second embodiment, with branch unit 302A interposed therebetween. With such a configuration, the number (capacity) of the operable refrigerant-using units may in some cases be smaller than the number (capacity) of the connected refrigerant-using units, although connection to heat source unit 301 is permitted. For example, an upper limit of the connection capacity of the refrigerant-using units is 200% (three units are connected), while an upper limit of the operation capacity of the refrigerant-using units is 130% (the number of the operable units is up to two).

In such a case, within the range of restrictions on the number of the units corresponding to the capacity of heat source unit 301, controller 110A automatically starts the heating operation of at least one or more of the plurality of refrigerant indoor units at the start of hot water supply.

When these restrictions are imposed, controller 110A executes control as follows in the second embodiment.

Figure 8:
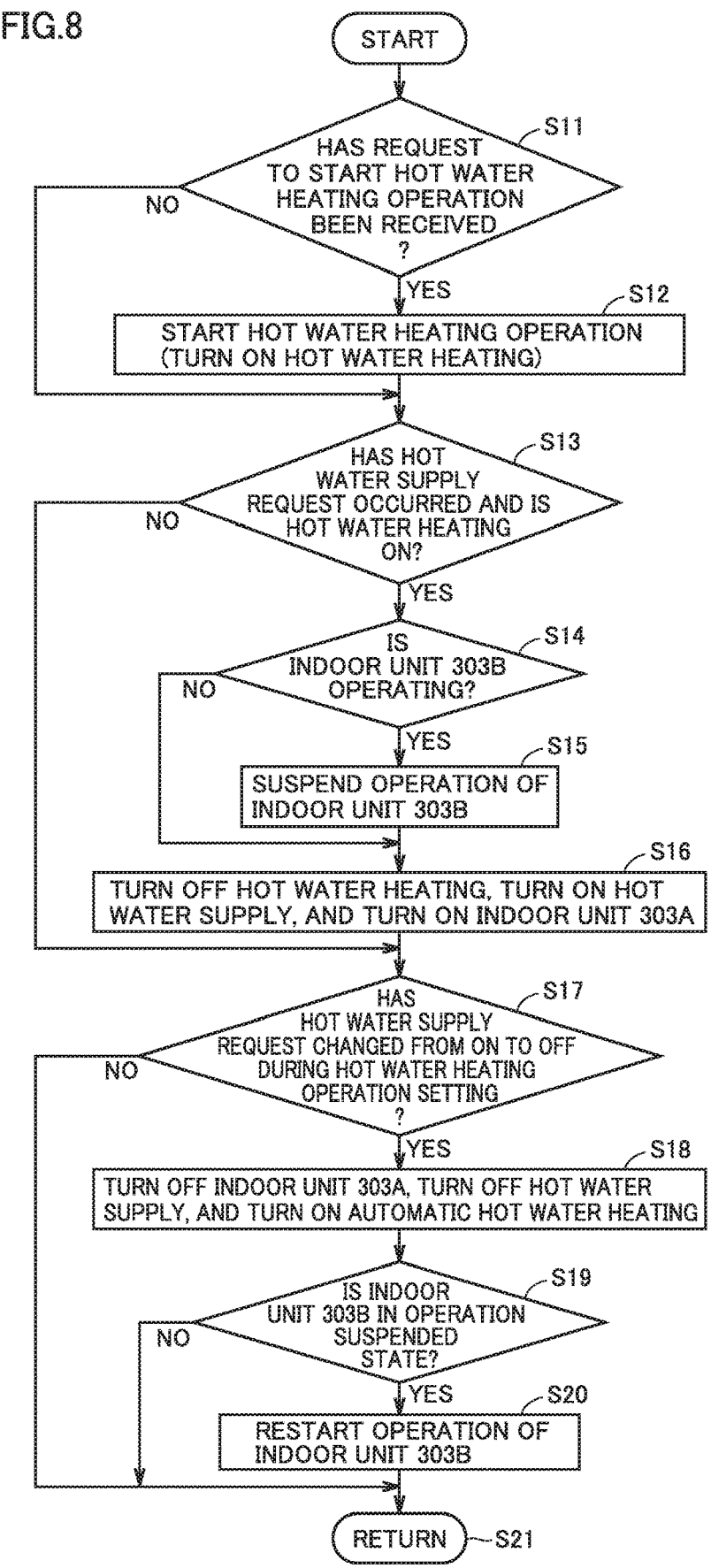
FIG. 8 is a flowchart for illustrating control of assisted heating when there are restrictions on the number of operating units.

FIG. 8 is a flowchart for illustrating control of assisted heating when there are restrictions on the number of operating units. The process in this flowchart is called from a main routine and executed at fixed time intervals. Referring to FIGS. 6 and 8, in step S11, controller 110A determines whether or not a request to start the hot water heating operation has been received from input unit 108 of remote controller 107. When the request to start the hot water heating operation has been received (YES in S11), controller 110A controls heat source unit 301, branch unit 302A and hot water unit 304 so as to start the hot water heating operation in step S12, and moves the process to step S13. On the other hand, when the request to start the hot water heating operation has not been received (NO in S11), controller 110A moves the process to step S13 without performing the process in step S12.

In step S13, it is determined whether or not the hot water supply request has occurred and hot water heating is ON. When the condition of step S13 is satisfied, the process is moved to step S14.

In step S14, it is determined whether or not refrigerant indoor unit 303B is performing the heating operation. When refrigerant indoor unit 303B is performing the heating operation in step S14 (YES in S14), controller 110A temporarily suspends the operation of refrigerant indoor unit 303B in step S15. When refrigerant indoor unit 303B is not performing the heating operation in step S14 (NO in S14), the process in step S15 is not performed.

In step S16, controller 110A turns on heating by refrigerant indoor unit 303A placed in the same room as hot water heating unit 305A, and controls three-way valve 20 such that hot water heating unit 305A is turned off and coil heat exchanger 18 is turned on, to thereby perform the simultaneous heating and hot water supply operation. When the condition of step S13 is not satisfied, the process is moved to step S17 without performing the process in steps S14 and S15.

A reason why higher priority is given to the operation of refrigerant indoor unit 303A than the operation of refrigerant indoor unit 303B as described above is that hot water heating units 305A and 305B are basically placed in many cases in a room where an inhabitant is highly likely to be. In this way, indoor heating can be continued in a room where an inhabitant is highly likely to be.

When a request signal to turn on heating is provided to refrigerant indoor unit 303B during a period in which hot water heating is OFF, hot water supply is ON and automatic heating by refrigerant indoor unit 303A is ON in step S16 of the flowchart in FIG. 8, addition is not permitted because the number of the operating units already exceeds the upper limit, i.e., two units (refrigerant indoor unit 303A and hot water unit 304). in this way, an insufficient heating ability on the first floor and a shortage of the hot water caused by deterioration of the hot water supply ability can be avoided.

Subsequently to step S16, the return process when the hot water supply request has no longer been received is performed in step S17 to step S20. First, in step S17, it is determined whether or not the hot water supply request has changed from ON to OFF during the hot water heating operation setting. When the condition of step S17 is satisfied, the process is moved to step S18.

In step S18, controller 110A turns off heating by refrigerant indoor unit 303A, and controls three-way valve 20 such that hot water heating unit 305A is turned on and coil heat exchanger 18 is turned off, to thereby end the simultaneous heating and hot water supply operation. When the condition of step S17 is not satisfied, the process is moved to step S21 without performing the process in steps S18 to S20.

Subsequently to step S18, the process is moved to step S19. In step S19, it is determined whether or not refrigerant indoor unit 303B is in a heating operation suspended state. When refrigerant indoor unit 303B is in the heating operation suspended state in step S19 (YES in S19), controller 110A restarts the operation of refrigerant indoor unit 303B in step S20. When refrigerant indoor unit 303B is not in the heating operation suspended state in step S19 (NO in S19), the process in step S20 is not performed.

Restriction of Simultaneous Heating Operation

During the hot water heating operation, the user may in some cases want to turn on heating by refrigerant indoor unit 303B on the second floor where the hot water heating unit is not placed. Normally, in the heating operation by refrigerant indoor unit 303B, it is necessary to set a blowing temperature to be not lower than 38° C. which is slightly higher than a person's body temperature. However, when a set temperature of hot water heating units 305A and 305B decreases in the case of hot water floor heating, a refrigerant temperature may become lower than 38° C. with the decrease in the set temperature. Generally, the set temperature is lower in the case of hot water floor heating than in the case of a fan coil and the like. When the refrigerant temperature decreases, it is difficult to set the blowing temperature to be not lower than 38° C. and thus the comfort of heating by the refrigerant indoor unit decreases.

Figure 9:
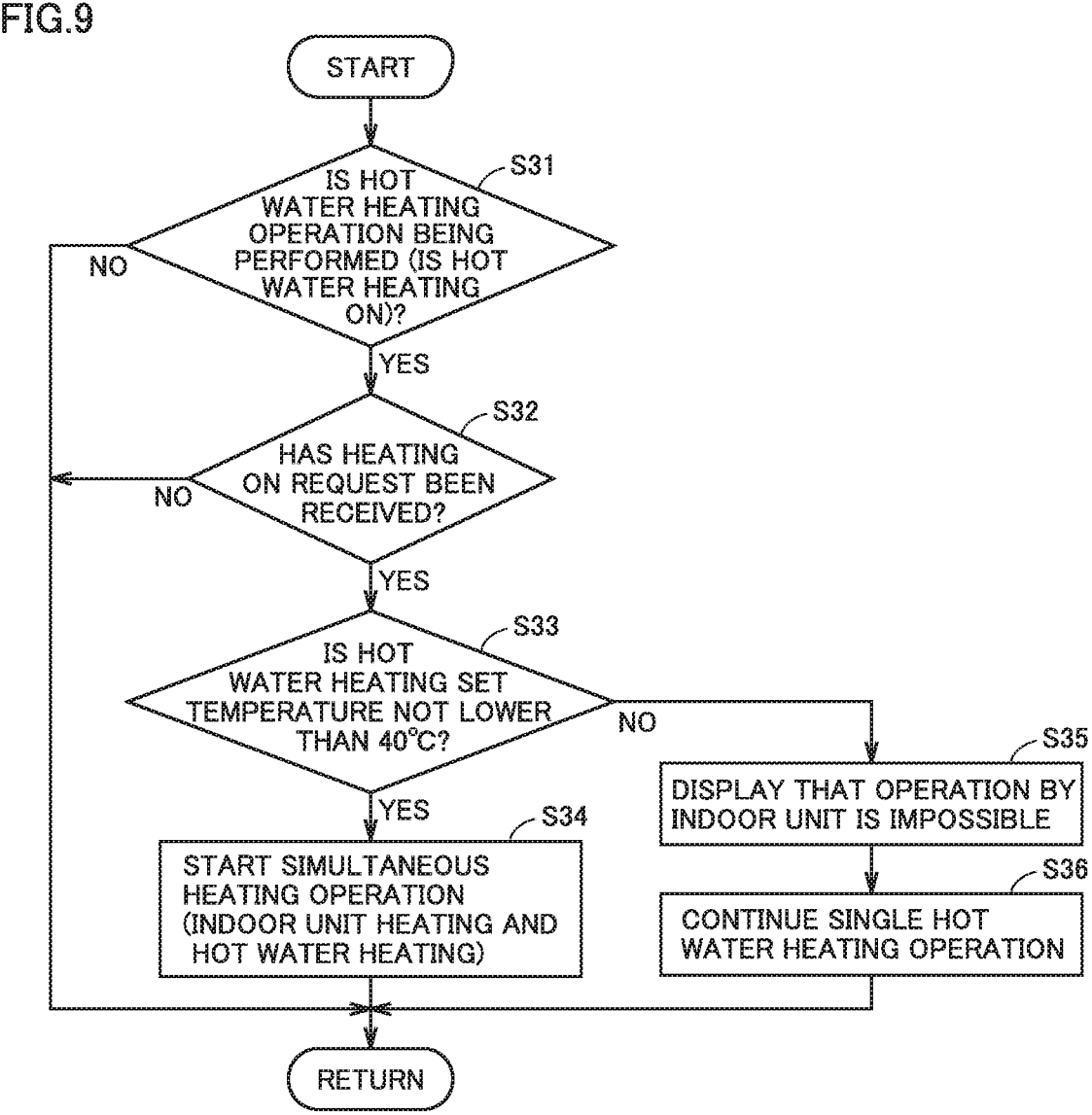
FIG. 9 is a flowchart for illustrating a process when a simultaneous heating operation is restricted.

Therefore, an operation in accordance with a flowchart described below is performed. FIG. 9 is a flowchart for illustrating a process when the simultaneous heating operation is restricted.

First, in step S31, controller 110A determines whether or not the air conditioning system is performing the hot water heating operation. When the air conditioning system is performing the hot water heating operation (YES in S31), controller 110A determines whether or not a request signal to turn on heating by the refrigerant indoor unit has been received in step S32. When the request to turn on heating by refrigerant indoor unit 303B has been received in step S32, controller 110A determines whether or not a hot water heating set temperature is not lower than a simultaneous heating operation threshold value in step S33. The simultaneous heating operation threshold value herein is., for example., 40° C. or higher that can ensure a temperature equal to or higher than a person's body temperature.

When the hot water heating set temperature is not lower than 40° C. in step S33, controller 110A moves the process to step S34 and performs the simultaneous heating operation in which the refrigerant indoor unit and hot water heating are performed. On the other hand, when the hot water heating set temperature is lower than 40° C. in step S33, controller 110A provides a display indicating that heating by the unit having received the request to turn on heating is impossible in step S35. In this case, a display for urging the user to change the hot water heating set temperature to 40° C. or higher may be provided when performing heating. In step S36, a single hot water heating operation is continued.

In this way, output of the low-temperature blown air from refrigerant indoor unit 303B can be avoided. In addition, since the user is urged to set the hot water heating set temperature high, the user can notice that it is necessary to set the hot water heating set temperature high when performing heating by refrigerant indoor unit 303B. As a result, since the user can implement the simultaneous heating operation by changing the set temperature, the simultaneous heating operation in which hot water heating is performed and the high-temperature blown air is output can be performed, and thus, the comfort is improved.

As shown in FIG. 9, when the heating operation mode has been specified and when the request to start heating for the refrigerant indoor unit has been received, controller 110A accepts the request to start heating in the case where the set temperature of heating by hot water heating unit 305 is higher than the threshold value (e.g., 40° C.), whereas controller 110A does not accept the request to start heating in the case where the set temperature is lower than the threshold value.

Remote controllers 107 for display may be separately provided for refrigerant indoor units 303A and 303B and hot water unit 304, or one integrated remote controller may display changes of the operations, and changes of the set temperatures of the plurality of refrigerant indoor units 303A and 303B and hot water unit 304.

Although determination is made based on the set temperature in step S33, the operation may be determined based on the unit form (hot water floor heating, a fan coil, a radiator and the like) of hot water heating units 305A and 305B. For example, the hot water heating set temperature is roughly determined depending on the unit form, and normally, the hot water heating set temperature is approximately 35° C. in the case of hot water floor heating, approximately 45° C. in the case of a fan coil, and approximately 50° C. in the case of a radiator. Therefore, the simultaneous heating operation is prohibited when hot water floor heating is included in the unit performing the hot water heating operation, and the simultaneous heating operation is performed when hot water floor heating is not included in the unit performing the hot water heating operation.

That is, when the heating operation mode has been specified and when the request to start heating for the refrigerant indoor unit has been received, controller 110A determines whether or not to accept the request to start heating based on the type of the heating unit using the secondary refrigerant.

In this way, the blowing temperature decreasing to a person's body temperature or lower at refrigerant indoor unit 303B during heating can be avoided. in addition, since the user can be urged to set the hot water heating set temperature high and the simultaneous heating operation can be performed, the comfort is improved.

Although determination is made based on the set temperature in step S33, the operation mode may he determined based on the condensing temperature. For example, in step S33, the saturation temperature at the pressure detected by pressure sensor 201 is set as the condensing temperature, and the simultaneous heating operation is permitted when the condensing temperature is not lower than 40° C., and the simultaneous heating operation is prohibited when the condensing temperature is lower than 40° C.

That is, when the heating operation mode has been specified and when the request to start heating for the refrigerant indoor unit has been received, controller 110A accepts the request to start heating in the case where the condensing temperature of heat source unit 301 is higher than the threshold value, and does not accent the request to start heating in the case where the condensing temperature of heat source unit 301 is lower than the threshold value. In this way, the blowing temperature decreasing to a person's body temperature or lower at refrigerant indoor unit 303B during heating can be avoided.

Although the common hot water set temperature is set for hot water heating units 305A and 305B in the present embodiment, the present invention is not limited thereto. The system may be configured such that separate set temperatures can be set for hot water heating unit 305A and hot water heating unit 305B. In this case, the lowest set temperature during hot water heating is used for comparison with the threshold value in step S33.

Although heat source unit 301 is a heat pump in the present embodiment, the present invention is not limited thereto. Heat source unit 301 may be a boiler heat source or a gas heat source.

As described above, in the second embodiment as well, indoor heating is not suspended during hot water supply, and thus, the indoor temperature is maintained and the comfort is improved, similarly to the first embodiment. In addition to the foregoing, in the second embodiment, the appropriate refrigerant indoor unit can be selected to continue heating even when there are a plurality of rooms and the refrigerant indoor units and when the hot water heating units are not necessarily placed in the same room.

Third Embodiment

A third embodiment will be described below. In the third embodiment, changes from the second embodiment will be mainly described.

Figure 10:
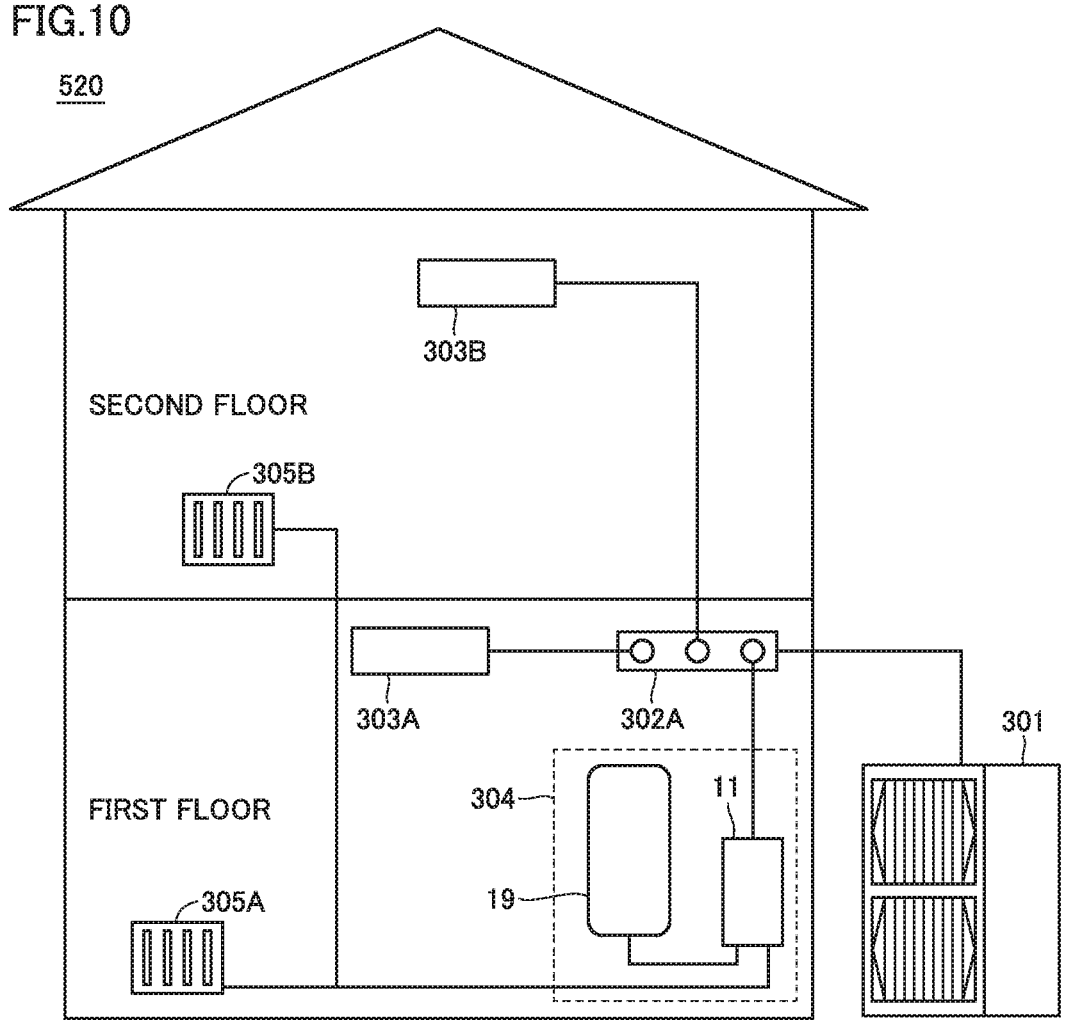
FIG. 10 is a diagram showing an overall configuration of an air conditioning apparatus 520 according to a third embodiment.

FIG. 10 is a diagram showing an overall configuration of an air conditioning apparatus 520 in the third embodiment. In the second embodiment, refrigerant indoor unit 303B on the second floor is placed in the room different from hot water heating unit 305B. In contrast, in the third embodiment, refrigerant indoor unit 303B and hot water heating unit 305B are placed in the same room on the second floor. In other words, in the third embodiment, hot water heating unit 305A arid refrigerant indoor unit 303A are placed in the same room on the first floor, and hot water heating unit 305B and refrigerant indoor unit 303B are placed in the same room on the second floor.

In this case, if ON of hot water supply and ON of automatic heating are directly applied during the simultaneous heating and hot water supply operation, ON of automatic heating by refrigerant indoor unit 303A, ON of automatic heating by refrigerant indoor unit 303B, and ON of hot water supply by hot water unit 304 coincide with one another. In this case, the three units operate and the ability of heat source unit 301 is exceeded, and thus, the low-temperature air is blown from refrigerant indoor units 303A and 303B. Therefore, in the third embodiment, refrigerant indoor unit 303A to be subjected to ON of automatic heating is selected and ON of automatic heating is applied only to selected refrigerant indoor unit 303A. In this way, the heating ability can be ensured for a room where the user requires greater heating ability.

Since a configuration of a refrigerant circuit of the air conditioning apparatus in the third embodiment is also the same as the configuration shown in FIG. 6, description will not be repeated.

Figure 11:
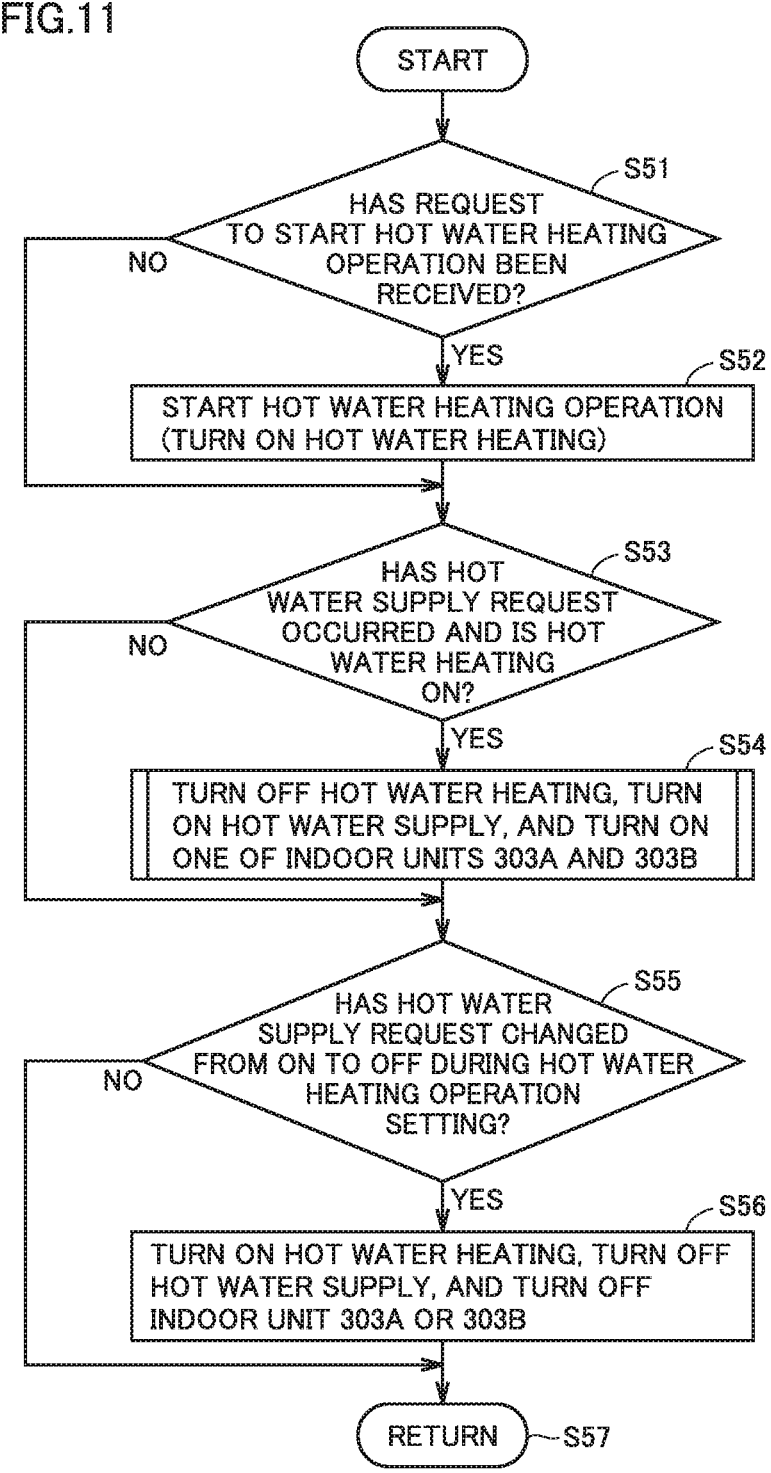
FIG. 11 is a flowchart for illustrating control executed in the third embodiment.

FIG. 11 is a flowchart for illustrating control executed in the third embodiment. The process in this flowchart is called from a main routine and executed at fixed time intervals. Referring to FIGS. 6 and 11, in step S51, controller 110A determines whether or not a request to start the hot water heating operation has been received from input unit 108 of remote controller 107. When the request to start the hot water heating operation has been received (YES in S51), controller 110A controls heat source unit 301, branch unit 302A and hot water unit 304 so as to start the hot water heating operation in step S52, and moves the process to step S53. On the other hand, when the request to start the hot water heating operation has not been received (NO in S51), controller 110A moves the process to step S53 without performing the process in step S52.

In step S53, it is determined whether or not the hot water supply request has occurred and hot water heating is ON. When the condition of step S53 is satisfied, the process is moved to step S54. In step S54, controller 110A controls three-way valve 20 such that hot water heating unit 305 is turned off and coil heat exchanger 18 is turned on, and turns on one of refrigerant indoor units 303A and 303B, to thereby perform the simultaneous heating and hot water supply operation. When the condition of step S53 is not satisfied, the process is moved to step S55 without performing step S54.

In step S55, controller 110A determines whether or not the hot water supply request has changed from ON to OFF during the simultaneous hot water supply and heating operation. The case in which the hot water supply request has been turned off refers to the case in which hot water supply has been completed and heating has progressed in coil heat exchanger 18, and as a result, the hot water has accumulated in hot water storage tank 19. When the hot water supply request has no longer been received in step S55, the process is moved to step S56. In step S56, automatic heating by refrigerant indoor unit 303A or 303B is turned off, and three-way valve 20 is controlled such that hot water supply is turned off and automatic hot water heating is turned on. On the other hand, when the hot water supply request continues in step S55 or when the simultaneous hot water supply and heating operation is not being performed in step S55 (NO in S55), and when the process in step S56 is performed, the process is returned to the main routine in step S57.

Figure 12:
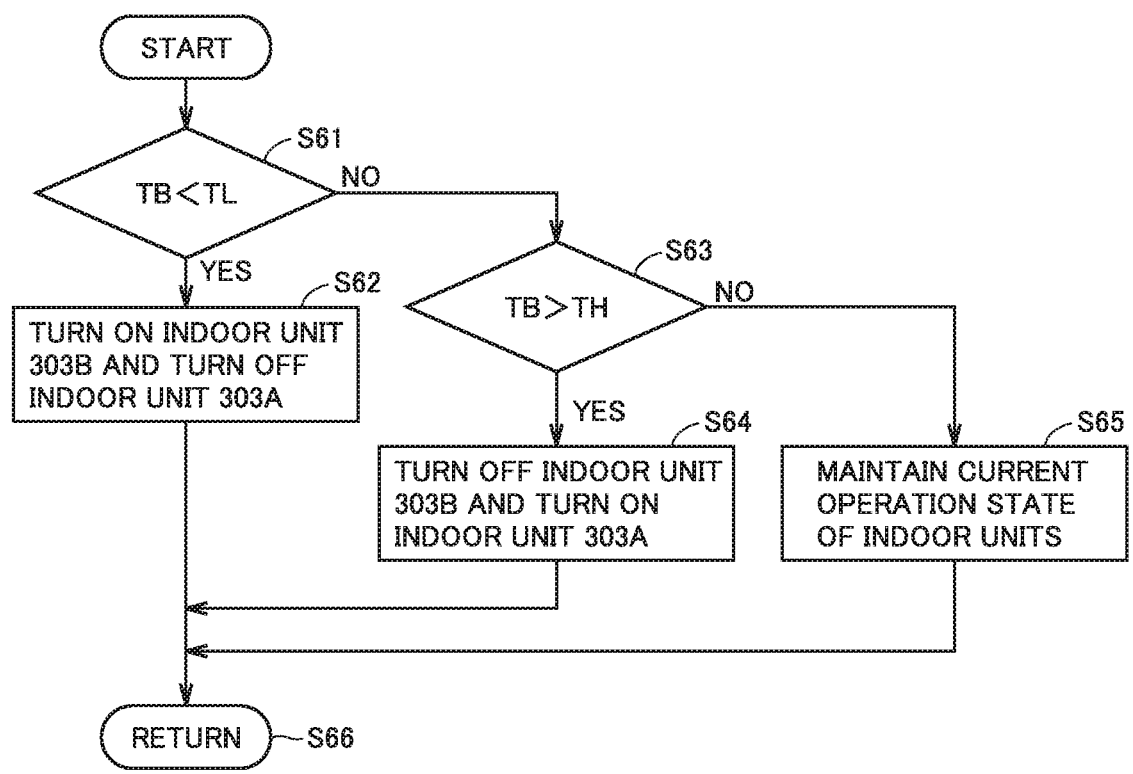
FIG. 12 is a flowchart showing one example of a process for selecting a refrigerant indoor unit that operates in step S54 in FIG. 11.

FIG. 12 is a flowchart showing one example of a process for selecting the refrigerant indoor unit performed in step S54 in FIG. 11. In the selection process in this flowchart, higher priority is given to the operation of refrigerant indoor unit 303A on the first floor until a temperature TB of the room on the second floor where refrigerant indoor unit 303B is placed decreases to TL lower than an air conditioning set temperature TH.

Referring to FIG. 12, first, in step S61, main controller 101A determines whether or not temperature TB of the room on the second floor is lower than threshold value TL. When TB<TL is satisfied in step S61 (YES in S61), main controller 101A turns on refrigerant indoor unit 303B and turns off refrigerant indoor unit 303A in step S62.

When TB<IL is not satisfied in step S61 (NO in S61), the process is moved to step S63. In step S63, main controller 101A determines whether or not temperature TB of the room on the second floor is higher than set temperature TH. When TB>TH is satisfied in step S63 (YES in S63), main controller 101A, turns off refrigerant indoor unit 303B and turns on refrigerant indoor unit 303A in step S64.

When TB>TH is not satisfied in step S63 (NO in S63), the process is moved to step S65. In step S65, main controller 101A maintains the current operation state of the refrigerant indoor units.

When the operation state of the refrigerant indoor units is determined in any of steps S62, S64 and S65, the process is moved to step S66 and the control is returned to the flowchart in FIG. 11.

Figure 13:
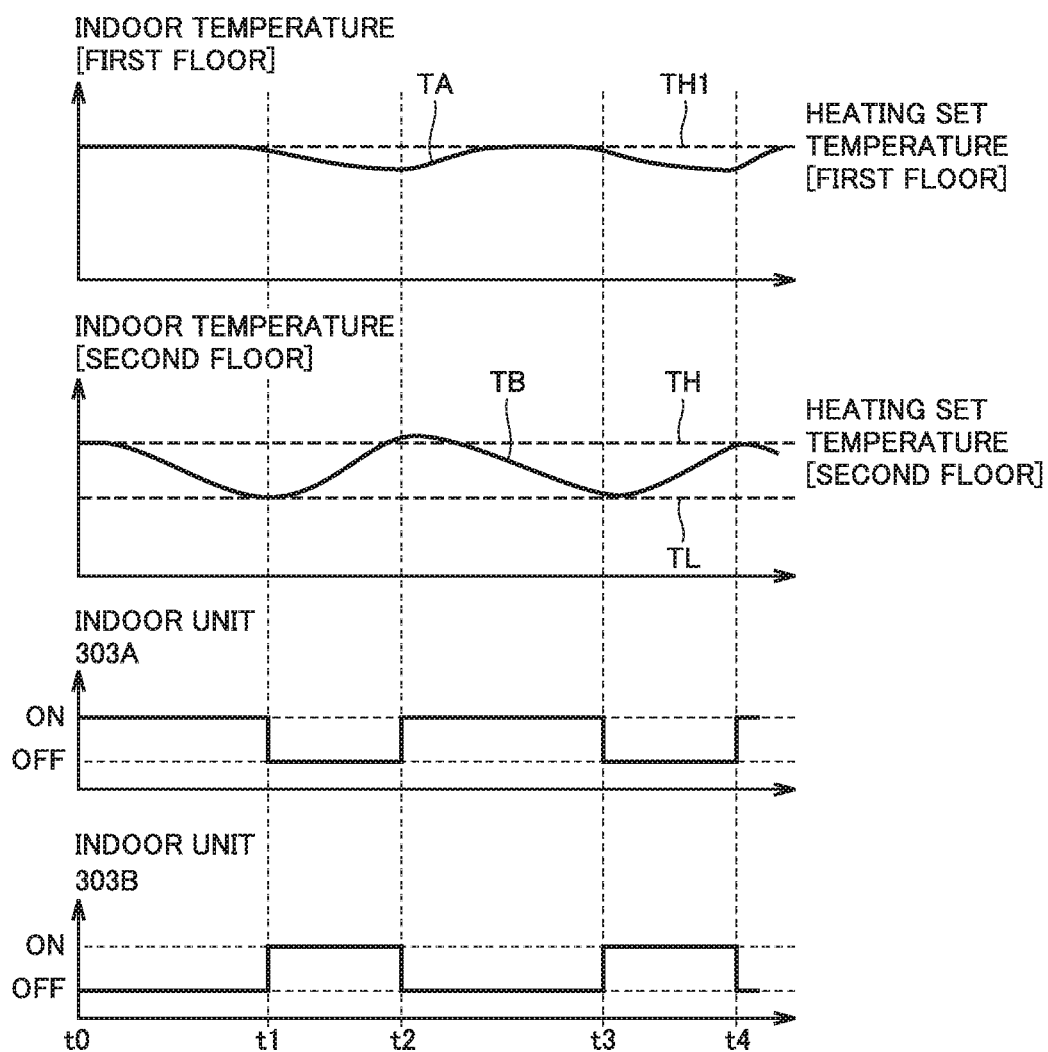
FIG. 13 is a timing chart for illustrating an example of adjusting the operation of refrigerant indoor units 303A and 303B by the selection process in the flowchart shown in FIG. 12.

FIG. 13 is a timing chart for illustrating an example of adjusting the operation of refrigerant indoor units 303A and 303B by the selection process in the flowchart shown in FIG. 12. In FIG. 13, an indoor temperature TA (first floor) is, for example, a temperature detected by temperature sensor 204A of refrigerant indoor unit 303A. Indoor temperature TB (second floor) is a temperature detected by temperature sensor 204B of refrigerant indoor unit 303B. Alternatively, a temperature detected by the temperature sensor (not shown) on the first floor used to adjust the temperature of hot water heating unit 305A and a temperature detected by the temperature sensor (not shown) on the second floor used to adjust the temperature of hot water heating unit 305B may be set as the indoor temperature on the first floor and the indoor temperature on the second floor, respectively. Heating ON threshold value TL is set to a value obtained by subtracting a predetermined value from heating set temperature TH (e.g., a value obtained by subtracting 3° C.).

From times t0 to t1 in FIG. 13, main controller 101A selects refrigerant indoor unit 303A as a refrigerant indoor unit to be subjected to ON of automatic heating. In this case, at time t1 when indoor temperature TB of refrigerant indoor unit 303B becomes equal to or lower than heating ON threshold value TL, main controller 101A stops refrigerant indoor unit 303A and turns on automatic heating by refrigerant indoor unit 303B.

When indoor temperature TB (second floor) reaches set temperature TH at time t2, main controller 101A stops refrigerant indoor unit 303B and turns on automatic heating by refrigerant indoor unit 303A. From then on, the process at times t1 and t2 is repeated at times t3 and t4, respectively.

As described above, in the third embodiment, controller 110A changes the refrigerant indoor unit that automatically performs heating, in accordance with the temperatures of the rooms where the plurality of refrigerant indoor units are placed.

As described above, in the third embodiment, the temperatures of the plurality of rooms where hot water heating units 305A and 305B are placed can be adjusted, and thus, impairment of the comfort can be avoided even if the users are both on the first floor and on the second floor, in addition to the effects produced in the first and second embodiments.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

REFERENCE SIGNS LIST 1 compressor; 2 four-way valve; 3, 4A, 4B, 7A, 7B, 9, 10, 12, 21, 22 pipe; 5, 5A, 5B, 14 heat exchanger; 6, 6A, 6B, 15 blower; 8, 8A, 8B, 13 decompressing mechanism; 11 water heat exchanger; 16 accumulator; 17 water pump; 18 coil heat exchanger; 19 hot water storage tank; 20 three-way valve; 23 branch point; 101, 101A main controller; 102 measurement unit; 103 arithmetic unit; 104 control unit; 105 storage unit; 107 remote controller; 103 input unit; 109 display unit; 110, 110A controller; 201 pressure sensor; 202, 203, 203A, 203B, 204, 204A, 204B, 205, 205A, 205B, 206 to 213 temperature sensor; 301 heat source unit; 302 branch unit; 303, 303A, 303B refrigerant indoor unit; 304 hot water unit; 305, 305A, 305B hot water heating unit; 500, 510, 520 air conditioning apparatus.

The invention claimed is:

1. An air conditioning apparatus configured to perform heating and hot water supply, the air conditioning apparatus comprising:
a heat source unit configured to operate as a heat source of a first refrigerant;
a heating unit placed in a room and configured to perform heating by circulating a second refrigerant;
a refrigerant indoor unit configured to receive the first refrigerant from the heat source unit and perform air conditioning of the room; and
a hot water unit configured to heat the second refrigerant by circulating the first refrigerant and generate hot water by circulating the second refrigerant, the hot water unit comprising:
a hot water storage tank;
a first heat exchanging unit configured to exchange heat between the first refrigerant and the second refrigerant;
a second heat exchanging unit configured to exchange heat between the second refrigerant and water in the hot water storage tank; and
a flow path selection unit configured to select from two available options including (i) the second heat exchanging unit and the first heat exchanging unit forming a circulation passage and (ii) the heating unit and the first heat exchanging unit forming a circulation passage,
wherein when the heating unit is operating and when a request for hot water in the hot water storage tank occurs, the flow path selection unit is configured to select the second heat exchanging unit and the first heat exchanging unit forming the circulation passage, and the refrigerant indoor unit is configured to start heating.

2. The air conditioning apparatus according to claim 1, further comprising
a controller configured to switch the flow path selection unit so as to select the second heat exchanging unit, and start heating by the refrigerant indoor unit, when the heating unit is operating and when the request for the hot water occurs.

3. The air conditioning apparatus according to claim 2, wherein after the flow path selection unit selects the second heat exchanging unit, when there is a change in state of the air conditioning apparatus that does not include a request for hot water the controller is configured to return the selection by the flow path selection unit to the heating unit and to control the refrigerant indoor unit so as to stop heating.

4. The air conditioning apparatus according to claim 2, wherein the controller comprises:
an input unit configured to receive information of placement locations of the refrigerant indoor unit and the heating unit;
a storage unit configured to store the information of placement locations; and
a control unit configured to determine whether or not the refrigerant indoor unit is placed in the room where the heating unit is placed, based on the information of placement locations stored in the storage unit.

5. The air conditioning apparatus according to claim 2, wherein when the heating unit is being used and when a heating start request for the refrigerant indoor unit occurs, the controller is configured to accept the heating start request in a case where a set temperature of heating using the heating unit is higher than a threshold value, and not to accept the heating start request in a case where the set temperature is lower than the threshold value.

6. The air conditioning apparatus according to claim 2, wherein when the heating unit is being used and when a heating start request for the refrigerant indoor unit occurs, the controller is configured to determine whether or not to accept the heating start request, based on a type of the heating unit using the second refrigerant.

7. The air conditioning apparatus according to claim 2, wherein when the heating unit is being used and when a heating start request for the refrigerant indoor unit occurs, the controller is configured to accept the heating start request in a case where a condensing temperature of the heat source unit is higher than a threshold value, and not to accept the heating start request in a case where the condensing temperature of the heat source unit is lower than the threshold value.

8. The air conditioning apparatus according to claim 2, wherein
the refrigerant indoor unit is a first refrigerant indoor unit of a plurality of refrigerant indoor units, and
within a range of restrictions on the number of units corresponding to a capacity of the heat source unit, the controller is configured to automatically start a heating operation of at least one or more of the plurality of refrigerant indoor units at the start of hot water supply.

9. The air conditioning apparatus according to claim 2, wherein
the refrigerant indoor unit is a first refrigerant indoor unit of a plurality of refrigerant indoor units, and
the controller is configured to select an indoor unit that automatically performs heating from the plurality of refrigerant indoor units, in accordance with temperatures of rooms where the plurality of refrigerant indoor units are placed.

10. The air conditioning apparatus according to claim 1, further comprising
a display unit configured to provide a display indicating that the refrigerant indoor unit is in an automatically operating state or in an automatically stopped state.

* * * * *